(12) United States Patent
Lee et al.

(10) Patent No.: US 6,817,783 B2
(45) Date of Patent: Nov. 16, 2004

(54) OPTICAL SUBASSEMBLY WITH REPLACEABLE OPTICAL SLEEVE

(75) Inventors: Jung Yuan Lee, Tu-Chen (TW); Nan Tsung Huang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 250 days.

(21) Appl. No.: 10/033,500

(22) Filed: Dec. 27, 2001

(65) Prior Publication Data

US 2003/0095760 A1 May 22, 2003

(30) Foreign Application Priority Data

Nov. 21, 2001 (TW) .......................................... 90220078

(51) Int. Cl.[7] ................................................ G02B 6/36
(52) U.S. Cl. .............................. 385/93; 385/88; 385/92
(58) Field of Search .............................. 385/88–94, 33, 385/34, 79

(56) References Cited

U.S. PATENT DOCUMENTS

| | | | | |
|---|---|---|---|---|
| 4,915,470 A | * | 4/1990 | Moore et al. ................. | 385/94 |
| 4,997,254 A | * | 3/1991 | Ganev ........................... | 385/90 |
| 6,283,644 B1 | * | 9/2001 | Gilliland et al. .............. | 385/93 |
| 6,302,596 B1 | * | 10/2001 | Cohen et al. .................. | 385/93 |
| 6,354,747 B1 | * | 3/2002 | Irie et al. ...................... | 385/88 |

* cited by examiner

*Primary Examiner*—Hemang Sanghavi
(74) *Attorney, Agent, or Firm*—Wei Te Chung

(57) ABSTRACT

An optical subassembly includes an optical sleeve (1), a lens holder (2) having a cylindrical cavity (21) defined therein, and an optical element (4) received in the cavity. A stepped fixing hole (11) is longitudinally defined through the optical sleeve, for receiving an optical connector. The lens holder includes the cavity, a lens member (3), and a cylindrical protuberance (23) extending from a top surface of the lens holder. The protuberance is coupled into the fixing hole to ensure precise alignment of the optical connector, an optical axis of the lens member and the optical element. The optical sleeve is readily detachable from the lens holder. Therefore, when the optical connector needs to be changed to another kind of optical connector, the original optical sleeve can be replaced with a new suitable optical sleeve. The same lens holder can continue to be used.

16 Claims, 5 Drawing Sheets

OPTICAL SUBASSEMBLY WITH REPLACEABLE OPTICAL SLEEVE

BACKGROUND OF THE INVENTION

1. Field of the Invention

The present invention relates to optical subassemblies, and particularly to a receptacle-type optical subassembly having a replaceable sleeve portion.

2. Description of the Related Art

Optical subassemblies are utilized in optoelectronic transceiver modules and coupled to optical connectors for providing bi-directional transmission of data between an electrical interface and an optical data link. Generally, an optical subassembly includes a housing, a lens and an optical element. The housing includes a cavity for accommodating the optical element, and a fixing hole for receiving a ferrule of the optical connector. Popular Face Contact/Subscriber Connector (FC/SC) style optical connectors and small form factor (SFF) optical connectors utilize ferrules having diameters of 2.5 mm and 1.25 mm respectively. Furthermore, the engaging structures of such connectors that attach the ferrule in the fixing hole of the optical subassembly also vary. Therefore, it is frequently problematic when the optical connector for a given optical subassembly needs to be changed.

U.S. Pat. No. 5,692,083 discloses an integrally molded in-line optical piece. The optical piece has an optical sleeve for receiving an optical connector, an integrally molded lens, and a cavity for reception of an optical header. The optical piece is integrally molded. Therefore, when the optical connector in the optoelectronic transceiver module is changed, the entire optical piece must also be changed. This unduly inflates costs.

U.S. Pat. No. 5,189,716 discloses a photo-semiconductor module for being optically coupled to an optical connector. The module comprises a holder assembly, a photo-semiconductor, and a lens. Each such component is individually made, and the components are then joined together by soldering or press-fitting. The components must be assembled with great accuracy. Production costs are correspondingly high.

In view of the above, there is a need for an improved optical subassembly which overcomes the abovementioned problems.

SUMMARY OF THE INVENTION

Therefore, an object of the present invention is to provide an optical subassembly having a holding member which is easily replaceable.

Another object of the present invention is to provide an optical subassembly which can be easily and quickly assembled.

A further object of the present invention is to provide an optical subassembly which is inexpensive.

To achieve the above objects, an optical subassembly includes an optical sleeve, a lens holder having a cylindrical cavity defined therein, and an optical element received in the cavity. A stepped fixing hole is longitudinally defined through the optical sleeve, for receiving an optical connector. The lens holder includes the cavity, a lens member, and a cylindrical protuberance extending from a top surface of the lens holder. The protuberance is coupled into the fixing hole to ensure precise alignment of the optical connector, an optical axis of the lens member and the optical element. The optical sleeve is readily detachable from the lens holder. Therefore, when the optical connector needs to be changed to another kind of optical connector, the original optical sleeve can be replaced with a new suitable optical sleeve. The same lens holder can continue to be used.

Other objects, advantages and novel features of the present invention will be drawn from the following detailed description of a preferred embodiment of the present invention with attached drawings, in which:

DETAILED DESCRIPTION OF THE INVENTION

Figure 1:
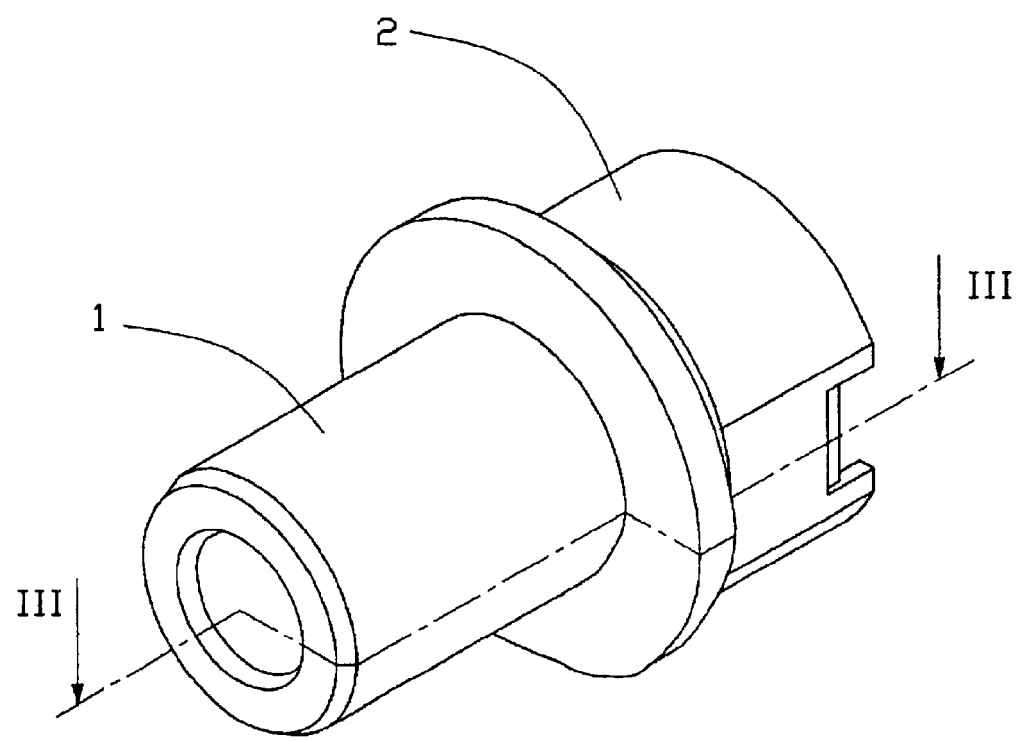
FIG. 1 is a perspective view of an optical subassembly in accordance with a preferred embodiment of the present invention.
Figure 2:
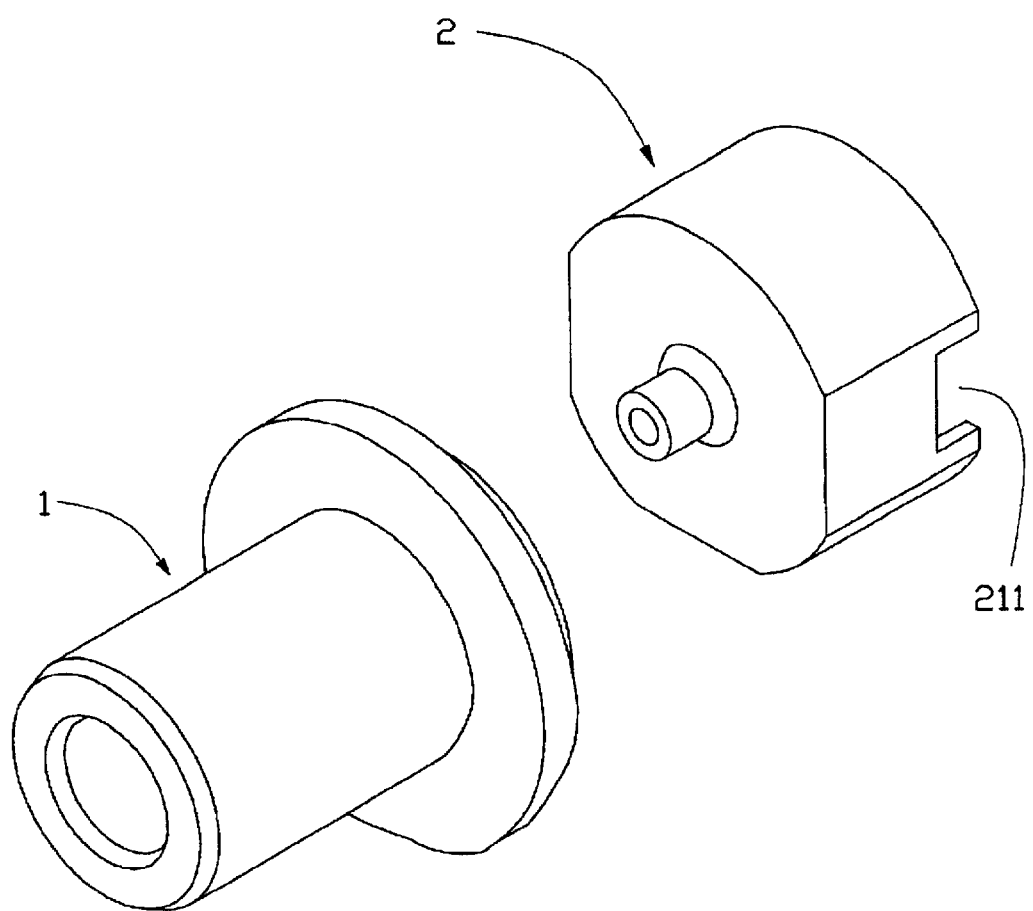
FIG. 2 is an exploded view of FIG. 1.
Figure 4:
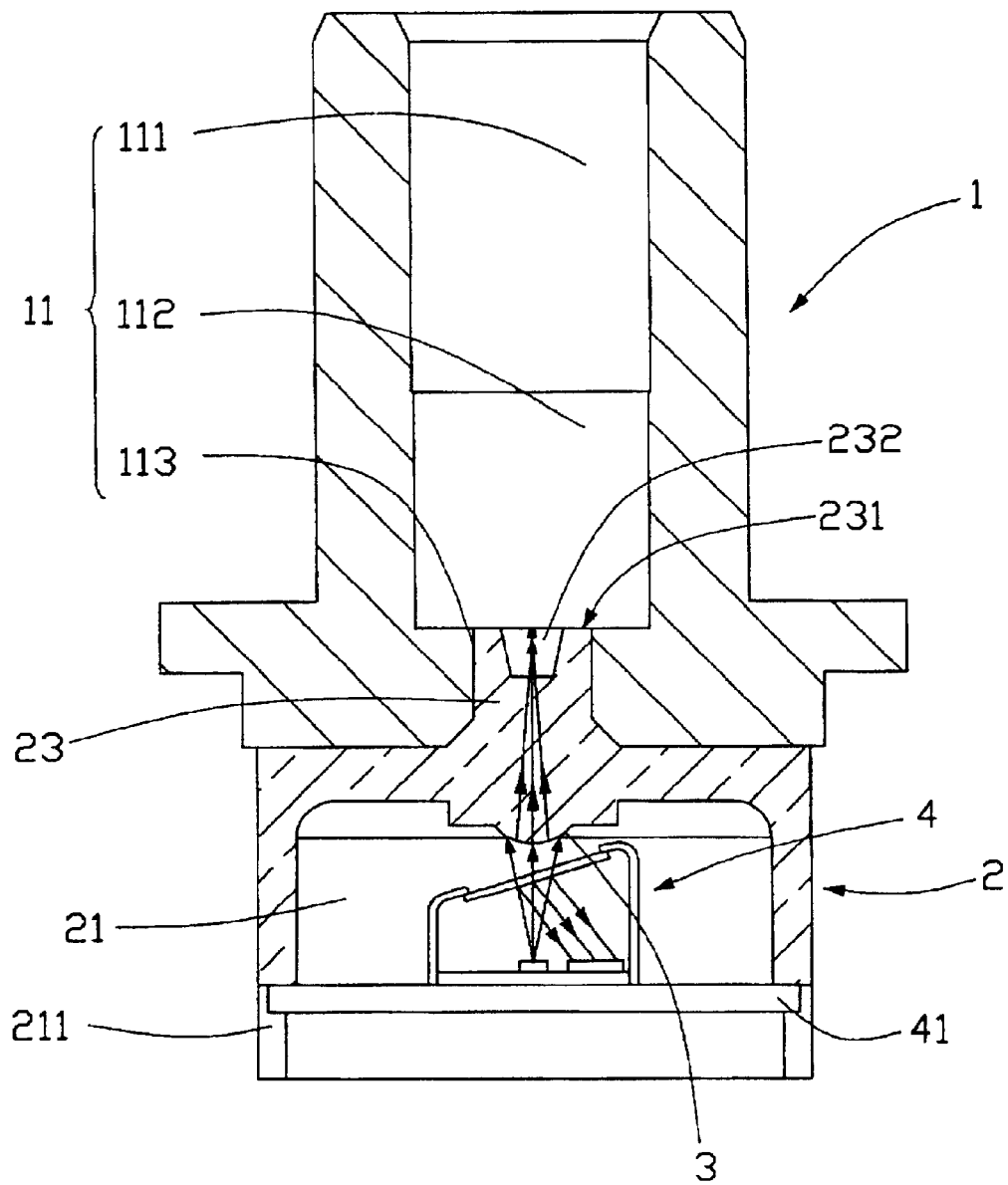
FIG. 4 is a cross-sectional view taken along line III—III of FIG. 1, and showing an optical element accommodated in the optical subassembly.

Referring to FIGS. 1 and 2, an optical subassembly in accordance with a preferred embodiment of the present invention includes an optical sleeve 1, a lens holder 2 having a cylindrical cavity 21 defined therein, and an optical element 4 received in the cavity 21 (see FIG. 4).

Figure 3:
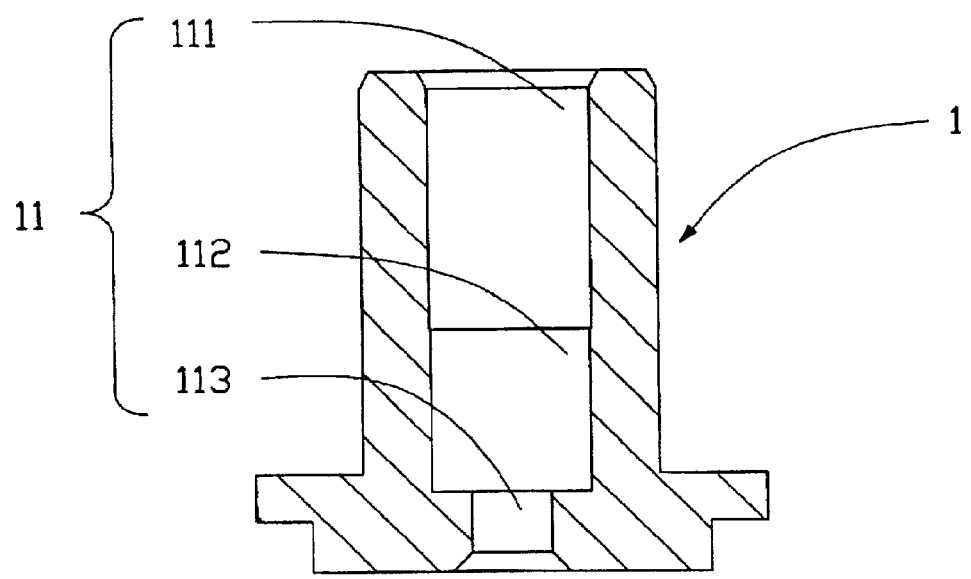
FIG. 3 is an exploded cross-sectional view taken along line III—III of FIG. 1.
Figure 3:
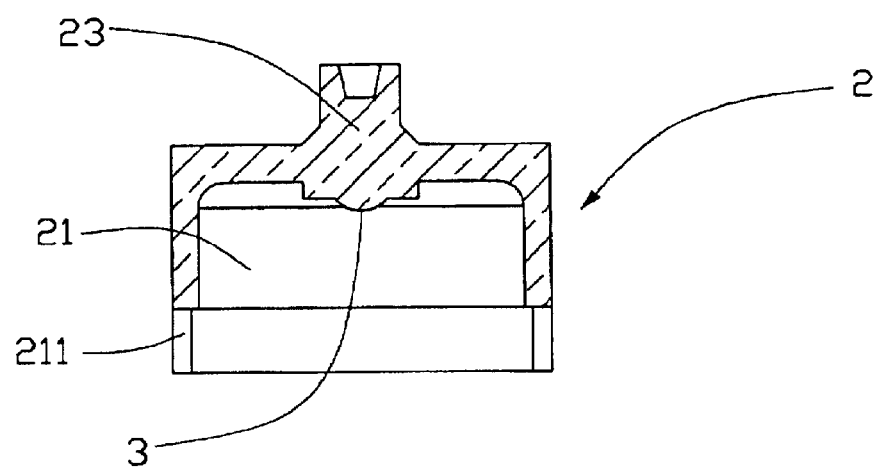

Referring to FIG. 3, the optical sleeve 1 is made of integrally molded plastic or another suitable material. A stepped fixing hole 11 is longitudinally defined through the optical sleeve 1, for receiving an optical connector (not shown). The fixing hole 11 comprises a cylindrical flared guide portion 111, a cylindrical positioning portion 112 and a cylindrical engaging portion 113, in sequential communication with each other in that order. The guide, positioning and engaging portions 111, 112, 113 are all cylindrical, and coaxial with one another. A diameter of the positioning portion 111 is less than a diameter of the guide portion 111.

The lens holder 2 is integrally made of transparent molded plastic or glass material. The lens holder 2 includes the cavity 21, a lens member 3 and a cylindrical protuberance 23 extending from a top surface of the lens holder 2, all of which are coaxial. This ensures precise alignment between the optical connector retained in the optical sleeve 1 and the lens member 3. The lens member 3 is formed inside the lens holder 2 between the cavity 21 and the protuberance 23, to converge light beams emitted from the optical element 4 (See FIG. 4). In the preferred embodiment, the lens member 3 is a ball lens or an ellipsoidal lens. If desired, either of such lenses can be manufactured separately and subsequently fixed on the lens holder 2.

Referring to FIGS. 2 and 4, a pair of cutouts 211 is defined in opposite sides of a distal end of the lens holder 2, in communication with the cavity 21. The optical element 4 is mounted on a base plate 41. The base plate 41 is fittingly attached to the lens holder 2 in the cutouts 211. The base plate 41 is precisely aligned with an optical axis of the lens member 3, and then fixed in the cutouts 211 with adhesive. The optical element 4 mounted on the base plate 41 is thereby accommodated in the cavity 21 and aligned with the optical axis of the lens member 3.

The protuberance 23 includes an end surface 231, and a recess 232 defined in a middle of the end surface 231. The recess 232 minimizes contact between an end surface of a fiber of the optical connector and the end surface 231.

In assembly of the optical subassembly, the protuberance 23 of the lens holder 2 is fittingly received in the engaging portion 113 of the optical sleeve 1. An end surface of the optical connector abuts the end surface 231 of the lens holder 2. This ensures that a fixed distance between the optical connector and the optical element 4 is maintained. The optical sleeve 1 is thus connected with the lens holder 2.

In use, the optical connector is inserted into the guide portion 111 and retained in the positioning portion 112 of the optical sleeve 1. The optical connector, the lens member 3 and the optical element 4 are all coaxial with one another.

Figure 5:
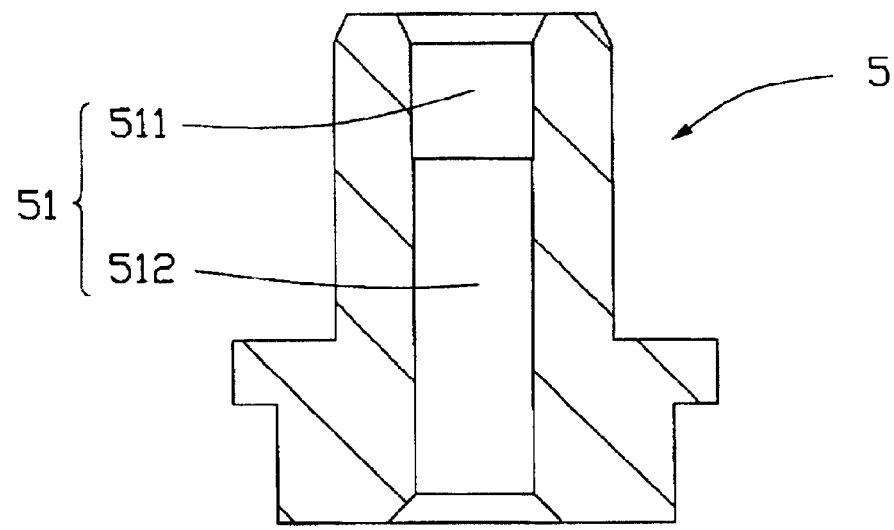
FIG. 5 is a cross-sectional view of an optical subassembly in accordance with an alternative embodiment of the present invention.
Figure 5:
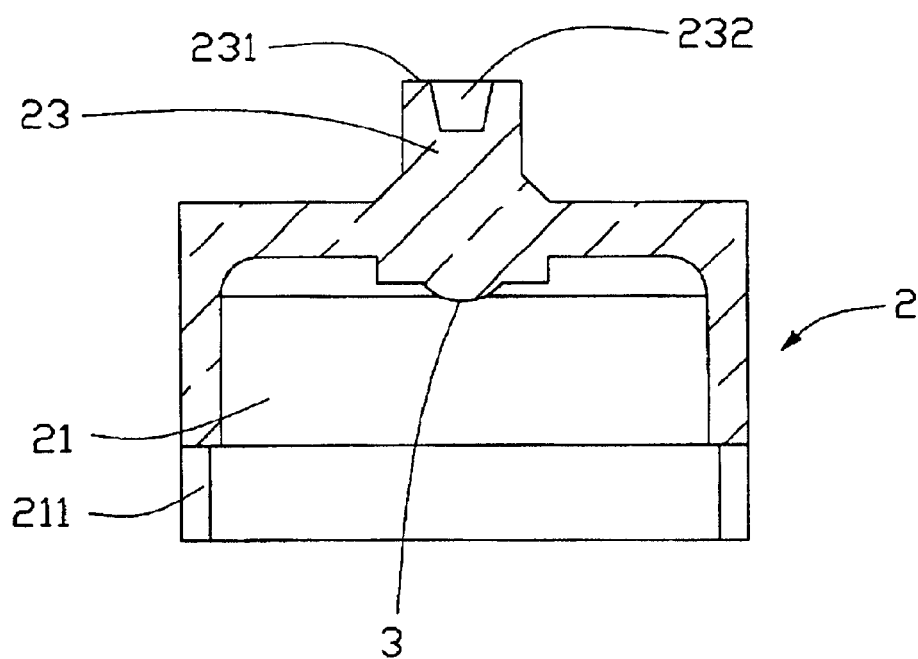

FIG. 5 shows an optical sleeve 5 in accordance with an alternative embodiment of the present invention. The optical sleeve 5 comprises a fixing hole 51. The fixing hole 51 includes a guide portion 511 and a positioning portion 512. In assembly, the protuberance 23 of the lens holder 2 is fittingly received in the positioning portion 512. The optical sleeve 5 is thus connected with the lens holder 2.

The lens holder 2 can be readily attached to a variety of optical sleeves 1, 5 that are configured to receive a variety of optical connectors needed for any particular application. Accordingly, when various optical connectors are needed, only the optical sleeves 1, 5 need to be configured to match the optical connectors. A same universal lens holder 2 can be used with all the optical sleeves 1, 5. Similarly, when a given optical connector needs to be replaced with a different kind of optical connector, only the optical sleeve 1, 5 needs to be replaced. The same lens holder 2 can be retained. All this saves time and reduces costs.

It should be understood that various changes and modifications to the presently preferred embodiments described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. An optical subassembly for coupling with an optical connector, the optical subassembly comprising:
   an optical sleeve defining a fixing hole to hold the optical connector;
   an optical element for transferring optical signals; and
   a lens holder connected with the optical sleeve, the lens holder comprising a cavity receiving the optical element therein, a protuberance directly coupling in the fixing hole of the optical sleeve, and a lens member being disposed between the optical element and the optical connector to converge light beams from the optical element.

2. The optical subassembly as described in claim 1, wherein the optical sleeve is integrally formed as a single piece, and the fixing hole includes a positioning portion for retaining the optical connector therein.

3. The optical subassembly as described in claim 1, wherein the optical sleeve is integrally formed as a single piece, the fixing hole includes a positioning portion for retaining the optical connector therein, and further includes an engaging portion for fittingly receiving the protuberance of the lens holder therein.

4. The optical subassembly as described in claim 3, wherein the positioning portion and the engaging portion are cylindrical and coaxial with each other.

5. The optical subassembly as described in claim 1, wherein the optical connector, the lens member and the optical element are all coaxial with one another.

6. The optical subassembly as described in claim 1, wherein the protuberance, the lens member and the cavity are all coaxial with one another.

7. The optical subassembly as described in claim 1, wherein the lens holder is made of transparent material.

8. The optical subassembly as described in claim 1, wherein the protuberance includes a surface adapted to abut an end surface of the optical connector.

9. An optical subassembly for coupling with an optical connector, the optical subassembly comprising:
   an optical sleeve being integrally formed as a single piece, and defining a fixing hole to hold the optical connector therein;
   an optical element for transferring optical signals; and
   a lens holder receiving the optical element therein, the lens holder including a protuberance and a lens member integrally formed, the protuberance connecting with the optical sleeve, the lens member being coaxially aligned between the optical connector and the optical element to converge light beams passing therebetween;
   wherein the fixing hole includes a positioning portion for retaining the optical connector therein, and further includes an engaging portion for fittingly receiving the protuberance of the lens holder therein.

10. The optical subassembly as described in claim 9, wherein the optical sleeve is integrally farmed as a single piece, and the fixing hole includes a positioning portion for retaining the optical connector therein.

11. The optical subassembly as described in claim 9, wherein the positioning portion and the engaging portion are cylindrical and coaxial with each other.

12. The optical subassembly as described in claim 9, wherein the lens holder is integrally formed as a single piece, and defines a cavity for receiving the optical element.

13. The optical subassembly as described in claim 12, wherein the protuberance, the lens member and the cavity are all coaxial with one another.

14. The optical subassembly as described in claim 9, wherein the lens holder is made of transparent material.

15. The optical subassembly as described in claim 9, wherein the protuberance includes a surface adapted to abut an end surface of the optical connector.

16. An optical subassembly comprising:
   an optical sleeve defining a fixing hole for receiving an optical connector;
   a lens holder defining a cavity receiving an optical element therein;
   a lens positioned in the lens holder and facing to and aligned with said fixing hole; and
   an interengagement device formed on an interface between said optical sleeve and said lens holder for fittingly coupling said optical sleeve and said lens holder together; wherein said interengagement device and said lens are coaxially arranged with each other to allow light, from the lens toward the connector, to be transmitted therethrough; wherein
   said lens holder is made of transparent material and said lens is integrally formed with said lens holder and with the same material thereof.

* * * * *